No. 854,286. PATENTED MAY 21, 1907.
T. GARE.
RESILIENT WHEEL.
APPLICATION FILED NOV. 21, 1905.

Witnesses:
Alfred Bosshardt
Stanley R. Bramall

Inventor.
Thomas Gare
Per F. Bosshardt
Attorney.

UNITED STATES PATENT OFFICE.

THOMAS GARE, OF NEW BRIGHTON, ENGLAND.

RESILIENT WHEEL.

No. 854,286.        Specification of Letters Patent.        Patented May 21, 1907.

Application filed November 21, 1905. Serial No. 288,391.

*To all whom it may concern:*

Be it known that I, THOMAS GARE, a subject of Great Britain, residing at New Brighton, in the county of Chester, England, have invented new and useful Improvements in and Connected with Silent and Resilient Wheels, of which the following is a specification.

This invention relates to improvements in and connected with silent and resilient vehicle wheels and the object is to so form and socket the outer end of the spokes in the felly that the silence and resiliency of the wheel is greatly increased, and the wheel is rendered more durable and easier to repair than hitherto has been the case.

To this end my invention consists in forming the outer spoke ends without shoulder, and taper or wedge shaped, and the ends of the felly segments to correspond with and serve as sockets for the said taper or wedge shaped ends, the latter extending across the whole width of the felly or rim and of a plate for each spoke end and abutting ends of the felly segments to hold the felly segments on the spoke ends laterally as well as radially in position and permit of radial depression thereon.

I attain these objects by the means illustrated in the accompanying drawings in which—

Figure 1:
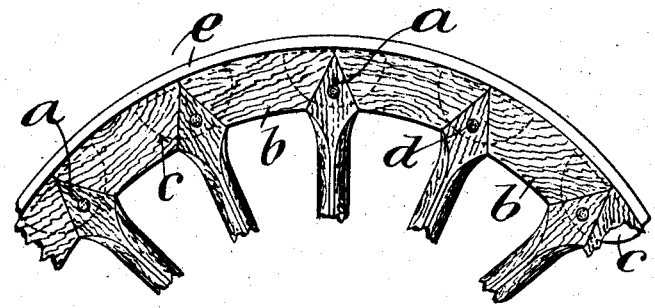
Figure 2:
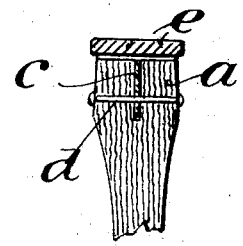
Figure 3:
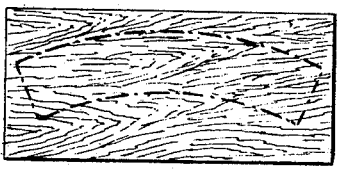
Figure 4:
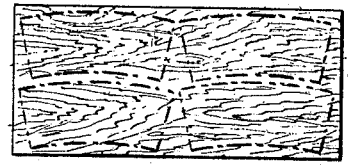

Figure 1 is a side view, Fig. 2 a vertical section of a wheel with wooden spokes and felly and ordinary tire, constructed in accordance with my invention. Figs. 3 & 4 illustrate the the manner of cutting out the wooden felly sections and the wood saved thereby.

Similar letters refer to similar parts throughout the several views.

In carrying out my invention and referring to the figures generally, *a* are the taper or wedge shaped outer spoke ends and *b* the felly segments bearing direct against the same.

When constructing a wheel with wooden spokes and felly as shown in Figs. 1 & 2, the felly is divided into segments each bearing directly against the taper or wedge shaped outer ends *a* of two spokes. Each two felly segments are laterally and also radially held in position on the spoke ends, by means of plates *c* let into the middle of the spoke end and the abutting end of the felly segment and secured to the spoke end by means of a rivet *d* or the like passing through the spoke end and plate. The said spoke ends are of such a length as not to bear against the tire and thereby be free from concussion.

A few of the advantages of the taper or wedge shaped outer spoke ends in connection with wooden fellies are as follows:—In ordinary wheels the weight of the load is taken onto the spoke across the grain of the felly which shrinking and being compressible, causes the spokes to become loose. In my invention the weight of the load is taken onto the spoke on the end grain of the felly, which is not subject to compression or shrinkage. In ordinary wheels the felly ends meet between the spokes and are liable to split off. The wheel is also weak where the fellies meet. A wheel constructed according to my invention is equal in strength all round as the felly ends are supported at every spoke and at the same time resilient and silent. Another important advantage is that the spoke ends being taper or wedge shaped, any outside pressure tightens the spokes and felly instead of loosening them as is the case in other wheels. Again the felly being short can be cut out of short and waste pieces which could not be used for ordinary fellies; and further, if cut out of straight material, quite double the number can be cut out of a block of the same size, see respectively Figs. 3 & 4. In ordinary wheels the fellies are also weakened by being drilled for the outer end of the spokes. In my invention this is obviated, the felly being at full strength all the way through.

I claim:

In a silent and resilient vehicle wheel, spokes with wedge shaped outer ends and felly segments with ends shaped to bear against and form a socket for the said outer spoke ends, a plate let into each of the said spoke ends and the adjacent ends of the felly segments and a fastening passing through the said spoke end and plate securing the plate to the spoke end, the ends of the said plate holding the said felly segments laterally as well as radially in position upon the wedge shaped spoke ends and allowing of radial depression thereon, all substantially as set forth.

In testimony whereof I have signed my name to this specification in the presence of two subscribing witnesses.

THOMAS GARE.

Witnesses:
 ALFRED BOSSHARDT,
 STANLEY E. BRAMALL.